United States Patent
Shigeta et al.

(10) Patent No.: US 7,832,707 B2
(45) Date of Patent: Nov. 16, 2010

(54) NORMALLY OPEN ELECTROMAGNETIC VALVE

(75) Inventors: Masaya Shigeta, Nagano (JP); Naoki Masuda, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 260 days.

(21) Appl. No.: 12/029,123

(22) Filed: Feb. 11, 2008

(65) Prior Publication Data

US 2008/0191156 A1   Aug. 14, 2008

(30) Foreign Application Priority Data

Feb. 14, 2007   (JP)   .......................... P. 2007-034139

(51) Int. Cl.
*F16K 31/02* (2006.01)

(52) U.S. Cl. .............................. 251/129.02; 251/129.15

(58) Field of Classification Search ............ 251/129.01, 251/129.02, 129.15

See application file for complete search history.

(56) References Cited

U.S. PATENT DOCUMENTS

| | | | |
|---|---|---|---|
| 5,066,980 A | 11/1991 | Schweizer | |
| 6,755,390 B2 * | 6/2004 | Masuda et al. | ............ 251/30.03 |
| 7,168,679 B2 * | 1/2007 | Shirase et al. | .......... 251/129.02 |
| 7,240,893 B2 * | 7/2007 | Komaba et al. | ........ 251/129.04 |
| 7,367,636 B2 * | 5/2008 | Ho | .......................... 303/119.2 |
| 7,396,090 B2 * | 7/2008 | Krawczyk et al. | ........ 303/119.2 |
| 7,398,795 B2 * | 7/2008 | Suzuki et al. | ............ 137/487.5 |
| 2001/0050347 A1 | 12/2001 | Otsuka et al. | |
| 2005/0001190 A1 | 1/2005 | Shirase et al. | |

FOREIGN PATENT DOCUMENTS

| | | |
|---|---|---|
| EP | 0 204 293 | 6/1986 |
| EP | 1 484 539 | 12/2004 |
| JP | 60-24983 | 2/1985 |
| JP | 11-108230 | 4/1999 |
| WO | 90/03037 | 3/1990 |

OTHER PUBLICATIONS

European Search Report for corresponding application No. EP 08002712.1.

* cited by examiner

*Primary Examiner*—John K Fristoe, Jr.
(74) *Attorney, Agent, or Firm*—Andrew M. Calderon; Roberts Mlotkowski Safran & Cole, P.C.

(57) ABSTRACT

A normally open electromagnetic valve includes a fixed core, a movable core, a coil, a valve body, a valve seat member, a return spring, a raised portion formed at one of the fixed and movable core so as to project towards the other core and a recessed portion formed at the other core so as to face the raised portion. A relationship between the raised and recessed portions is set such that while a distance therebetween is within a predetermined range, an attraction force acting between the fixed core and the movable core by virtue of an excitation force of the coil decreases as the raised portion approaches or moves into the recessed portion, and when the valve body and the valve seat surface are brought into abutment with each other by exiting the coil, the distance between the raised portion and the recessed portion stays within the predetermined range.

12 Claims, 5 Drawing Sheets

NORMALLY OPEN ELECTROMAGNETIC VALVE

BACKGROUND OF THE INVENTION

1. Field of the Invention

The present invention relates to a normally open electromagnetic valve, and more particularly to a linear solenoid valve which can change a produced differential pressure according to a value of electric current which flow through a coil.

2. Description of Related Art

In general, a electromagnetic valve (solenoid valve) has a coil, a fixed core and a movable core and is configured such that a magnetic field is produced by electric current flowing through the coil, whereby the fixed core and the movable core are made to be attracted to each other, so that the valve can be opened and closed by means of the attraction force acting between the cores.

In the case of a normally open electromagnetic valve, a return spring is provided to cause a valve body to normally stay apart from a valve seat surface so as to keep a flow path open, and when the coil is energized, the valve body is pushed against the valve seat surface to close the flow path.

Incidentally, in a linear solenoid valve which can change a produced differential pressure according to a value of electric current flowing through the coil, the valve is devised such that a valve closing force that acts when a valve body is brought into abutment with a valve seat surface hardly varies due to a production error.

For example, as is described in JP-UM-A-60-24983 and JP-A-11-108230, a raised portion is provided at the center of a lower end face of a movable core so as to project towards a fixed core, while a recessed portion is provided on an upper surface of the fixed core so as to accommodate the raised portion. By adopting this construction, when a constant electric current flows trough a coil, with the raised portion left staying out of the recessed portion, magnetic flux is caused to converge to corner portions of the raised portion and corner portions of the recessed portion, the fixed core and the movable core strongly attract each other. On the other hand, just before the raised portion enters the recessed portion or after the raised portion has entered the recessed portion, since attraction force produced by magnetic flux which passes near the corner portions acts only in a radial direction of the fixed core and does not work as a force which attracts the movable core towards the fixed core, even though the positional relationship between the raised portion and the recessed portion, in other words, the distance between the fixed core and the movable core changes, the attraction force acting between the fixed core and the movable core is made to hardly change.

Then, in the positional relationship where the attraction force is difficult to change, by bringing a valve body into abutment with a valve seat surface, the closing force of the valve can be made stable irrespective of there being an error in assembling parts together, and a construction like this is generally adopted in linear solenoid valves.

In the electromagnetic valve, however, since the valve body is repeatedly brought into abutment with the valve seat surface, it is inevitable that wear or fatigue is produced on the valve body and the valve seat surface. Due to this, even though the electromagnetic valve works to its designed specifications while maintaining its designed properties at an initial stage of use, after the use for a long period of time, an area over which working fluid pushes up the valve body (referred to as a "pressure-receiving area") tends to decrease, and this causes a problem that a relationship between the electric current that is caused to flow through the coil and the pressure of the working fluid that is used to open the valve body, that is, a produced differential pressure changes.

SUMMARY OF THE INVENTION

Then, the invention has been made in view of these situations and an object thereof is to provide a normally open electromagnetic valve which can continue to produce a designed valve closing force while maintaining its initial properties without any change even after the use of a long period of time.

With a view to solving the problem, according to an aspect of the invention, there is provided a normally open electromagnetic valve comprising:

a fixed core, a movable core disposed so as to advance and retreat relative to the fixed core;

a coil which produces a magnetic field passing through the fixed core and the movable core;

a valve body disposed so as to move together with the movable core;

a valve seat member comprising a funnel-shaped valve seat surface which is adapted to be brought into abutment with the valve body so as to close a flow path;

a return spring for biasing the valve body so as to move apart from the valve seat surface;

a raised portion formed at one of the fixed core and the movable core so as to project towards the other of the fixed core and the movable core; and a recessed portion formed at the other of the fixed core and the movable core so as to face the raised portion, wherein a relationship between the raised portion and the recessed portion is set such that while a distance therebetween is within a predetermined range, an attraction force acting between the fixed core and the movable core by virtue of an excitation force of the coil decreases as the raised portion approaches or moves into the recessed portion, and when the valve body and the valve seat surface are brought into abutment with each other by exiting the coil, the distance between the raised portion and the recessed portion stays within the predetermined range.

By adopting the configuration described above, the relationship is satisfied that in the state that the valve body and the valve seat surface are in abutment with each other, the more the raised portion and the recessed portion approach each other or the deeper the former enters the latter, the more the attraction force acting between the fixed core and the movable core decreases. Therefore, for example, when the valve seat surface wears, a relationship that the valve body bites further into the valve seat surface than when the valve was initially put into use is satisfied, the attraction force then acting between the fixed core and the movable core gets smaller than the initial attraction force. However, since the pressure receiving area gets smaller due to the valve body biting into the valve seat surface, the force which then causes the fluid to push up the valve body to open the flow path also gets smaller than the initial one.

Consequently, when comparing the state of the normally open electromagnetic valve when it was initially put into use and the state thereof when it has been in use for a long period of time, although the attraction force acting between the fixed core and the movable core is decreased, since the force which causes the fluid to push up the valve body is also decreased as the attraction force is decreased, a change in the differential pressure produced hardly occurs.

Note that the fact that the attraction force acting between the fixed core and the movable core by virtue of the excitation force of the coil decreases as the raised portion approaches or moves into the recessed portion means a decrease in attraction force which would result in case the recessed portion and the raised portion were made to approach each other with the abutment between the valve body and the valve seat surface eliminated.

The normally open electromagnetic valve is effective when it is a linear solenoid valve which can change a produced differential pressure according to a value of current which flows through the coil.

The normally open electromagnetic valve can be configured such that the movable core is integrated with the fixed core.

According to the normally open electromagnetic valve of the invention, when the constant electric current flows in the coil, the pressure of the fluid which opens the valve is hard to change between when the normally open electromagnetic valve was initially put into use and after it has been in use for a long period of time. Namely, even after the normally open electromagnetic valve has been long in use, the valve closing force can be produced while keeping the same properties as those of the normally open electromagnetic valve when it was initially put in use.

DETAILED DESCRIPTION OF THE PREFERRED EMBODIMENTS

Figure 2A:
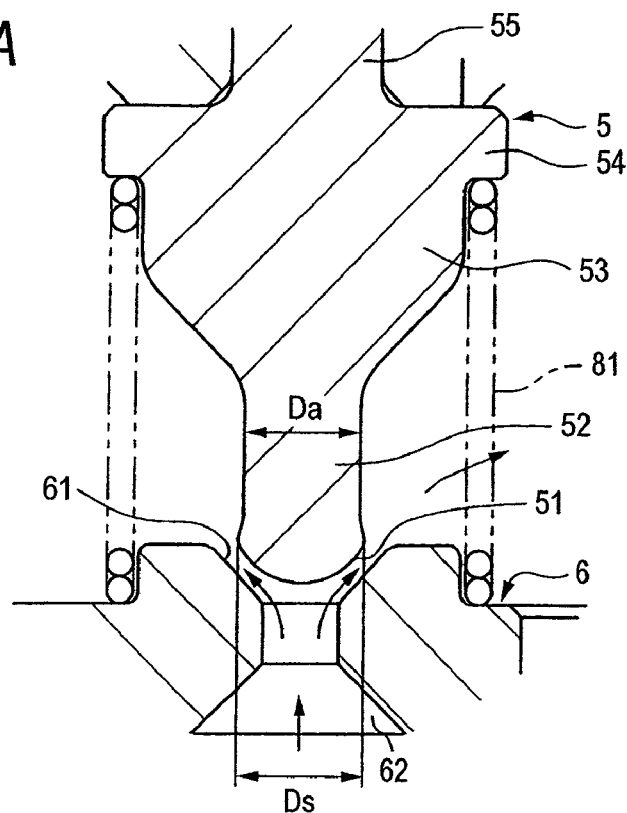
FIG. 2A is an enlarged view showing a state in which the same valve is opened.
Figure 2B:
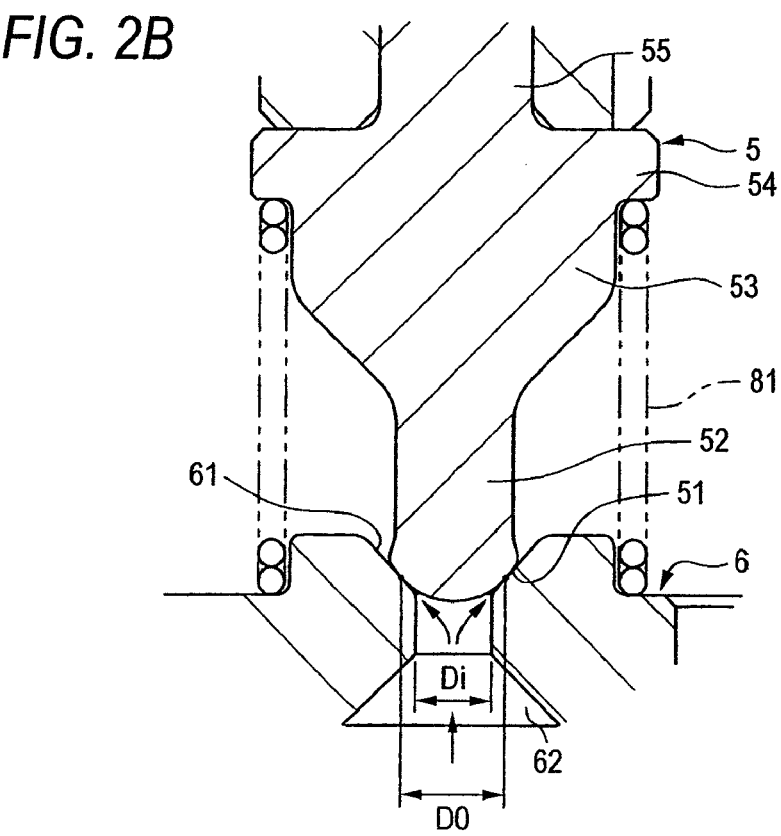
FIG. 2B is an enlarged view showing the same valve is closed.
Figure 3A:
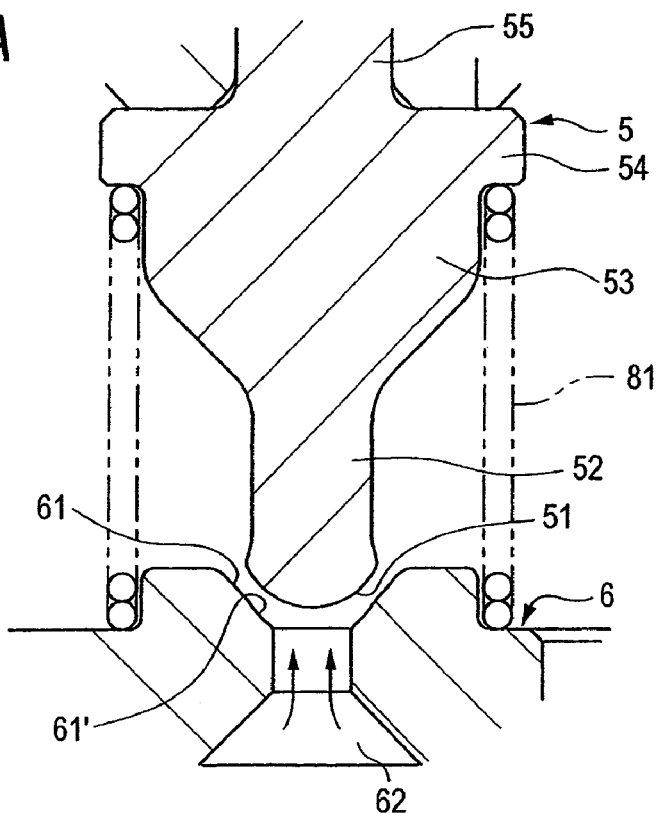
FIG. 3A is an enlarged view showing a valve seat member and a valve body with the normally open electromagnetic valve in an opened state after it has been long in use.
Figure 3B:
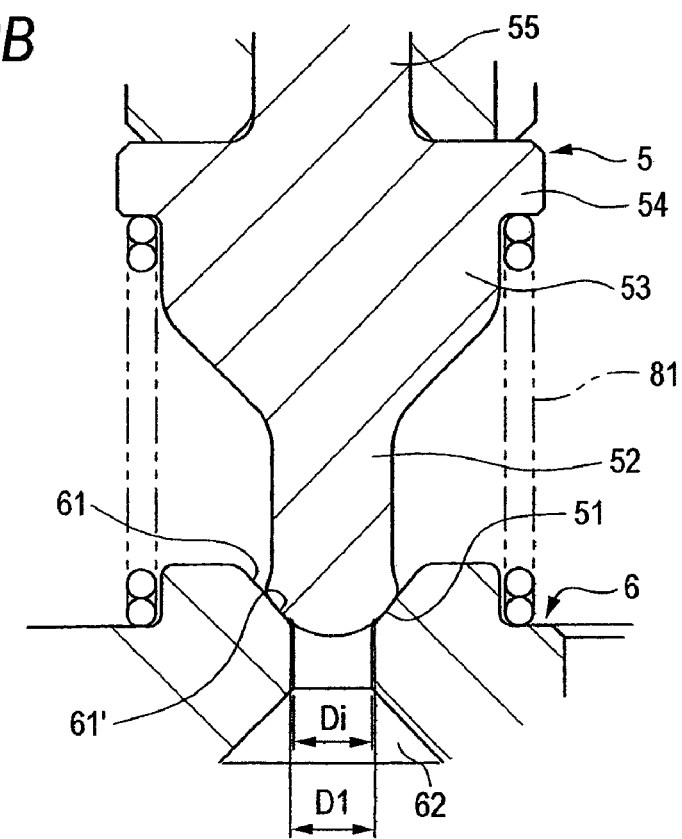
FIG. 3B is an enlarged view showing the valve seat member and the valve body with the normally open electromagnetic valve in a closed state after it has been long in use.

Next, an embodiment of the invention will be described in detail by reference to the drawings as required. In the drawings to be referred to, FIG. 1 is a vertical sectional view showing a normally open electromagnetic valve according to this embodiment, FIG. 2A is an enlarged view showing a state in which the same valve is opened, FIG. 2B is an enlarged view showing the same valve is closed, FIG. 3A is an enlarged view showing a valve seat member and a valve body with the normally open electromagnetic valve in an opened state after it has been long in use, and FIG. 3B is an enlarged view showing the valve seat member and the valve body with the normally open electromagnetic valve in a closed state after it has been long in use.

Figure 1:
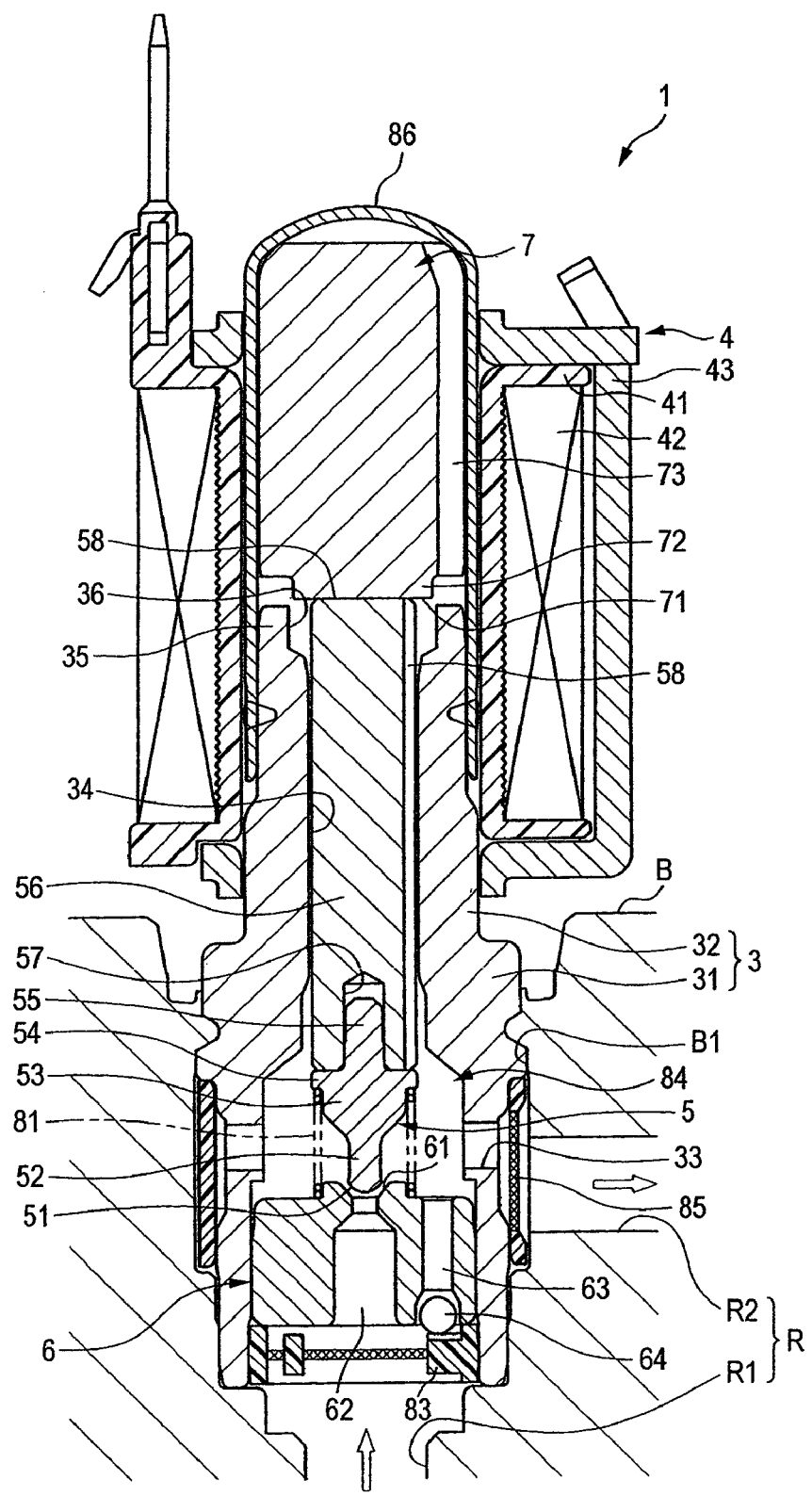
FIG. 1 is a vertical sectional view showing a normally open electromagnetic valve according to this embodiment.

As is shown in FIG. 1, a normally open electromagnetic valve 1 is a valve for switching between opening and closing of a flow path R formed in a base body B of an anti-lock brake system and is made up mainly of a fixed core 3, a coil unit 4, a valve body 5, a valve seat member 6 and a movable core 7.

In this normally open electromagnetic valve 1, the valve body 5 normally stays apart from the valve seat member 6, so as to allow the flow of working fluid from a flow path R1 which connects to a lower end portion of the normally open electromagnetic valve 1 and extends downwards thereof (as a matter of convenience, when used herein, lower/downward and upper/upward are based on FIG. 1) to a flow path R2 which connects to a side of the normally open electromagnetic valve 1 and extends laterally therefrom. In addition, when the valve body 5 is brought into abutment with the valve seat member 6 by the coil unit 4 being energized, the flow path R is closed so as to cut off the flow of the working fluid. In addition, in the normally open electromagnetic valve of the embodiment, when a difference between the pressure of the working fluid in the flow path R1 and the pressure of the working fluid in the flow path R2 is equal to or more than a predetermined value, the flow of the working fluid produced by the difference in pressure overpowers a valve closing force acting on the valve body 5 so as to open the flow path R. Namely, the normally open electromagnetic valve 1 is a linear solenoid valve (a differential pressure control valve) which can control the closing force of the valve body 5 according to a value of electric current which is caused through the coil unit 4 to energize it.

The fixed core 3 also functions as a housing which accommodates the other constituent parts and is a cylindrical member having a bore which penetrates therethrough vertically. The fixed core 3 is made up of a body portion 31 which is mounted on the base body B and a core portion 32 which is formed to have a thinner outside diameter than the body portion 31 and extends upwards. The valve body 5 and the valve seat member 6 are accommodated in an interior of the body portion 31.

A seal portion 51, which is formed into a semi-spherical shape, is formed at a distal end of the valve body 5, and a cylindrical stem portion 52 connects to this seal portion 51. A large diameter portion 53 is formed on the stem portion 52 so as to have a larger diameter than that of the stem portion 52, whereby the stem portion 52 and the large diameter portion 53 are formed into a shape in which they are connected together via a portion having a tapered shape. Namely, the diameter is gradually increased from the stem portion 52 towards the large diameter portion 53. A collar portion 54 is provided on the large diameter portion 53 so as to have a larger diameter than that of the large diameter portion 53. A connection pin 55 is formed on the collar portion 54 so as to extend upwards.

The valve seat member 6 is a flat cylindrical member, and a funnel-shaped valve seat surface 61 is formed at the center of an upper surface. An inlet path 62 is formed so as to penetrate vertically from a bottom of the valve seat surface 61. This inlet path 62 is a passage for allowing working fluid to flow from below the normally open electromagnetic valve 1 into a valve chamber 84 defined above the valve seat member. In addition, a return flow path 63, which is made to penetrate vertically, is formed in the valve seat member 6 in a position which is offset radially outwards from the inlet path 62. A ball valve 64 is disposed in a lower portion of the return flow path 63, so as to make up a check valve together with the return flow path 63. The fall or dislocation of the ball valve 64 is prevented by a filter 83 which is press fitted in an inside diameter of the body portion 31 at a lower end thereof.

The valve seat member 6, which is configured as has been described heretofore, is press fitted in an inner circumference of the body portion 31 for fixation.

A return spring 81 is disposed between the upper surface of the valve seat member 6 and the collar portion 54 of the valve body 5 which generates biasing force which causes the valve body 5 to stay apart from the valve seat member 6.

A plurality of through holes 33 are formed in a side wall of the body portion 31, so as to establish communications between the outside and the inside of the body portion 31. A tubular filter 85 is fitted on an outside of a portion of the body portion 31 where the through holes 33 are disposed, so as to remove foreign matters in working fluid which passes through the through holes 33.

The body portion 31 is inserted into an insertion hole B1 in the base body B and is then fixed in place by clamping the mounting hole B1 therearound.

A cylindrical surface 34 is formed in an interior of the core portion 32 so as to have a next smaller diameter than the valve chamber 84, and a rod-shaped retainer 56 is disposed within the cylindrical surface 34 so as to put the movable core 7 and the valve body 5 into an integral action. A connection hole 57 is formed in a lower end face of the retainer 56, whereby the connection pin 55 of the valve body 5 fits in the connection hole 57 so that the retainer 56 is allowed to move together with the valve body 5. Since the retainer 56 is biased upwards together with the valve body 5 by the return spring 81, an upper surface 58 of the retainer 56 is brought into abutment with a lower end face 71 of the movable core 7.

A plurality of grooves 59 are formed on a side surface of the retainer 56 in such a manner as to extend along the full length thereof (only one of them is shown in the figure). The grooves 59 allow working fluid lying above and below the retainer 56 to move therealong when the retainer 56 moves vertically so as to attain a smooth motion of the retainer 56.

An inside diameter of an upper end portion 35 of the core portion 32 is formed slightly larger than the cylindrical surface 34. This inside diameter is made to have a size which allows a raised portion 72, which will be described later, of the movable core 72 to fit therein. Namely, a recessed portion 36, which can accommodate a distal end of the raised portion 72, is formed on an upper surface of the core portion 32. The fixed core 3 is made of a magnetic material and attracts the movable core 7 when it is energized by the coil unit 4 so as to function to close the valve.

The movable core 7 is a cylindrical member which is made of a magnetic material and is disposed above the retainer 56. A groove 73 is formed on a side surface of the movable core 7 in such a manner as to extend along the full length thereof, so that working fluid lying above and below the movable core 7 can move therethrough so as to attain a smooth motion of the movable core 7.

The raised portion 72 is formed on the lower end face 71 of the movable core 7 so as to project at the center thereof into a circular contour. This raised portion 72 faces the recessed portion 36 on the upper surface of the fixed core 3 as has been described above and is sized to enter the recessed portion 36.

A bottomed cylindrical guide tube 86 is fitted on the core portion from the outside and is fixed thereto by being clamped. The movable core 7 is accommodated in this guide tube 86 so as to be guided thereby with respect to vertical advancing and retreating actions.

The coil unit 4 is made up of a resin bobbin around which a wire is wound into a coil 42, and a yoke 43 is disposed outside the bobbin 41 so as to form a magnetic path.

Next, a relationship between the valve seat member 6 and the valve body 5 will be described.

As is shown in FIG. 2A, the valve body 5 is such that a diameter Ds of an end portion which faces the stem portion 52 of the seal portion 51 is formed slightly larger than a diameter Da of the stem portion. Due to this, although it is moderate, a step portion is formed in a portion where the seal portion 51 connects to the stem portion 52.

When the valve is started to be used as is shown in FIG. 2A, although there is manufacturing error in some extent, the seal portion 51 bears a substantially spherically shaped surface. In addition, the valve seat surface 61 bears a distortion-free funnel shape which looks like expanding diametrically at a constant gradient.

Due to this configuration, when the seal portion 51 of the valve body 5 is brought into abutment with the valve seat surface 61 of the valve seat member 6, as is shown in FIG. 2B, the seal portion 51 and the valve seat member 6 come into contact with each other in a line fashion with a diameter Di of an end portion of the valve seat member 6 where the inlet path 62 connects to the valve seat surface 61. A contact radius resulting when the valve is put in use initially is regarded as a seal diameter D0.

Next, as is shown in FIG. 3A, when paying attention to a relationship between the valve body 5 and the valve seat member 6 which results after the valve has been long in use, as a result of repeated hard abutments between the valve seat surface 61 and the seal portion 51, both the components get wear and fatigued.

In FIG. 3A, although a worn shape of the seal portion 51 is not shown clearly, for example, the valve seat surface 61 wears as if it follows the spherically shaped surface of the seal portion 51 to thereby form a worn surface 61'. Due to this, as is shown in FIG. 3B, when the seal portion is brought into contact with the valve seat surface 61, the former contacts the latter in a surface fashion at a smaller seal diameter D1 than the seal diameter D0 which resulted when the valve was initially put in use.

This seal diameter D1 is specified by a diameter at an innermost portion of a portion where the seal portion 51 and the valve seat surface portion 61 (the worn surface 61'). This is because an area where the pressure of working fluid within the inlet path 62 is received is determined by the diameter of the innermost portion of the portion where the seal portion 51 and the valve seat surface 61 are in contact with each other.

In this way, after the valve has been long in use, the pressure receiving area of the seal portion 51 becomes smaller than that resulting when the valve was initially put in use. Due to this, in the event that the pressure of the working fluid in the inlet path 62 remains the same, a force which the valve body 5 receives from the working fluid (a valve opening force) becomes smaller after the valve has been long in use than when the valve was initially put in use.

Next, the attraction force between the fixed core 3 and the movable core 7 generated when exciting the coil 42 will be explained.

Figure 4A:
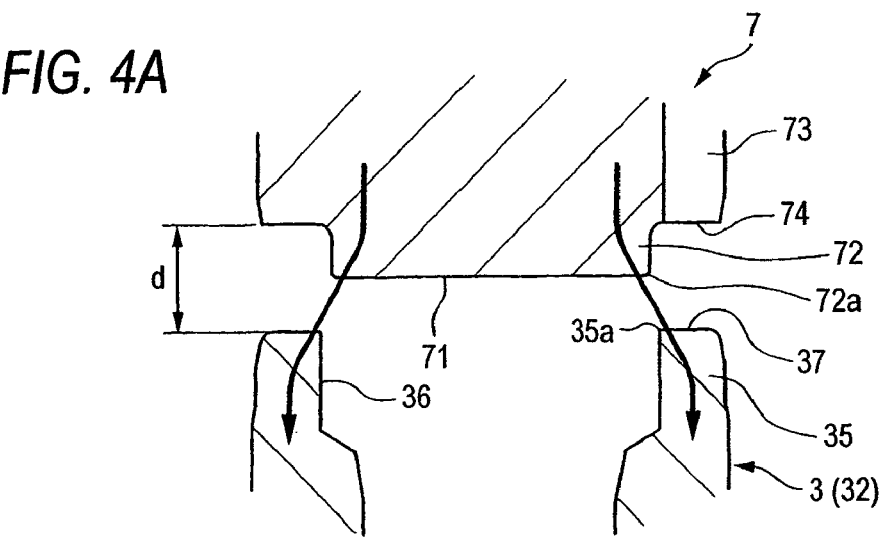
FIG. 4A shows an enlarged sectional view showing a relationship between a fixed core and a movable core in a state where a raised portion and a recessed portion are kept apart from each other.
Figure 4B:
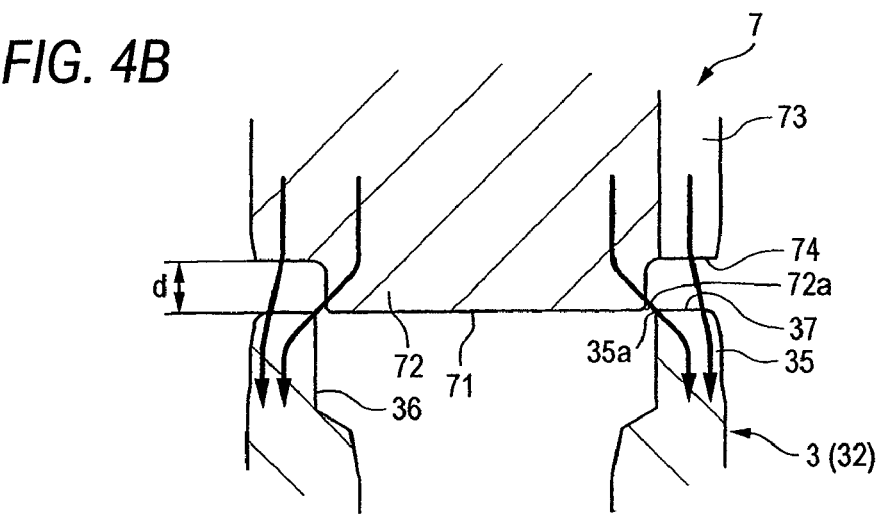
FIG. 4B shows an enlarged sectional view showing a relationship between a fixed core and a movable core in a state where the raised portion and the recessed portion approach each other.
Figure 4C:
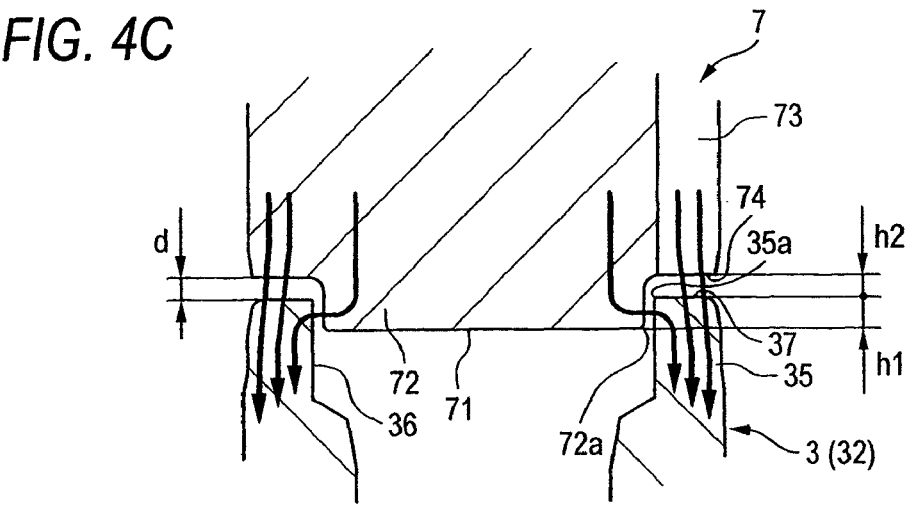
FIG. 4C shows an enlarged sectional views showing a relationship between a fixed core and a movable core in a state where the raised portion has entered the recessed portion.
Figure 5A:
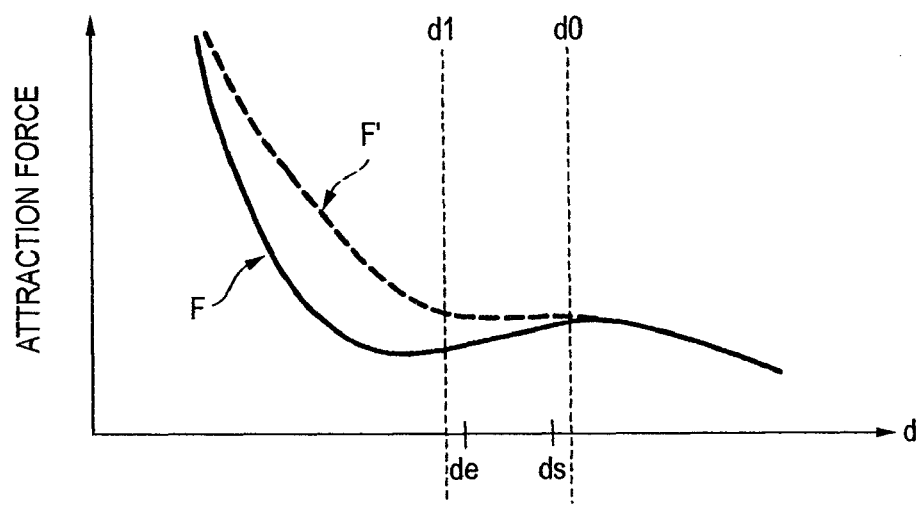
FIG. 5A is a graph showing a relation ship a distanced between the raised portion and the recessed portion and an attraction force acting therebetween.
Figure 5B:
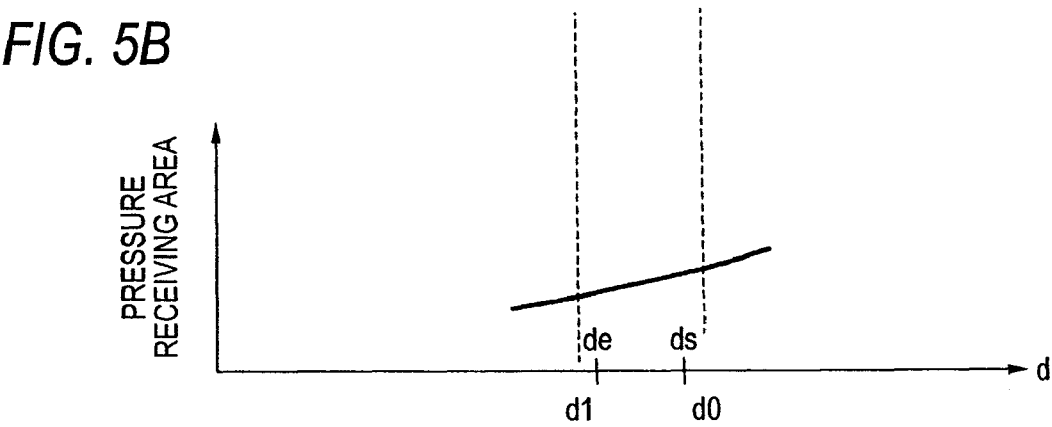
FIG. 5B is a graph showing a relationship between the distance between the raised portion and the recessed portion and a pressure receiving area.

FIGS. 4A, 4B and 4C show enlarged sectional view showing relationship between the fixed core and the movable core, FIG. 4A shows a state where the raised portion and the recessed portion are kept apart from each other, FIG. 4B shows a state where the raised portion and the recessed portion approach each other, and FIG. 4C shows a state where the raised portion has entered the recessed portion. FIG. 5A is a graph showing a relation ship the distance between the raised portion and the recessed portion and the attraction force acting therebetween, and FIG. 5B is a graph showing a relationship between the distance between the raised portion and the recessed portion and a pressure receiving area.

With the raised portion 72 staying apart from the recessed portion 36, when the coil 41 is energized, when entering from the movable core 7 to the fixed core 3, magnetic lines of force converge on a portion where both are closest to each other for entry. Due to this, as is indicated by arrows in FIG. 4A, magnetic lines of force converge a path which connects an outer edge 72a of the raised portion 72 and an inner edge 35a of the outer end portion 35 of the fixed core 3 together for passage. Since components in an axial direction of the normally open electromagnetic valve 1 (components in a vertical direction in the figure) of the magnetic lines of force act as attraction force, they act as magnetic force (attraction force) which causes the fixed core 3 and the movable core 7 to attract each other in the vertical direction.

When the raised portion 72 and the recessed portion 36 approach each other, however, the edge 72a and the edge 35a come to be adjacent to each other, as is shown in FIG. 4B, whereby the orientation of magnetic lines of force which pass through both the edges 72a, 35a is inclined obliquely, and the vertical components become small. Furthermore, as is shown in FIG. 4C, when the raised portion 72 enters the recessed portion 36, a side surface of the raised portion 72 comes to face an inner circumference of the upper end portion 35, and this portion constitutes a closest portion. However, magnetic lines of force, which pass through this portion where the raised portion 72 and the upper end portion 35 come to be closest to each other, have almost no vertical component, and the magnetic lines of force hardly act to contribute to the production of magnetic force which causes the fixed core 3 and the movable core 7 to attract each other.

On the other hand, since an upper surface of the upper end portion 35 and an end face 74 of an outer portion of the raised portion 72 which faces the upper surface 37 approach each other, magnetic lines of force which pass through the upper surface 37 and the lower end face 74 function as magnetic force (attraction force) which causes the fixed core 3 and the movable core 7 to attract each other.

As a result of the raised portion 72 and the recessed portion 36 being in such a relationship, the attraction force which causes the fixed core 3 and the movable core 7 to attract each other exhibits a relationship shown in FIG. 5A. In FIG. 5A, attraction force F' indicated by a broken line indicates attraction force in a conventional normally open electromagnetic valve, while attraction force F indicated by a solid line indicates attraction force in the normally open electromagnetic valve in the normally open electromagnetic valve of this embodiment. A distance d expressed by an axis of abscissa denotes a distance between the upper surface 37 of the upper end portion 35 of the wall which makes up the recessed portion 36 and the lower end face 74 of the outer portion of the raised portion 72 (refer to FIGS. 4A to 4C). Note that the distance between the recessed portion and the raised portion may only have to be based on a position where a clear measurement thereof is facilitated according to specific shapes of the raised portion and the recessed portion.

It is normal that the attraction force becomes larger as the distance d becomes shorter, but as is indicated by the attraction force F in FIG. 5A, in this embodiment, the attraction force, with which the fixed core 3 and the movable core 7 attract each other, is set such that the attraction force F becomes gradually large as the distance d becomes shorter. Thereafter, the attraction force F becomes smaller as the distance d becomes shorter within a predetermined distance range (a range spread from a distance d0 to a distance d1). Furthermore, when the distance d becomes much shorter thereafter, the attraction force becomes large again.

On the other hand, the attraction force F' in the conventional normally open electromagnetic valve is set such that the attraction force F' becomes gradually larger as the distance d becomes shorter within the predetermined distance range. Thereafter, there is almost no change in the attraction force F' within the predetermined distance range (the range spread from the distance d0 to the distance d1). Furthermore, when the distance becomes much shorter thereafter, the attraction force F' becomes larger.

The difference in setting like this can be adjusted by a radial gap amount between the raised portion 72 and the recessed portion 36, a projecting amount of the raised portion 72 and a receding amount of the recessed portion 36.

For example, as is shown in FIG. 4C, a tendency can be produced in which the attraction force F becomes smaller as the distance d becomes shorter by (1) increasing both a vertical overlapping amount h1 between the raised portion 72 and the recessed portion 36 and a gap amount h2 between the upper surface 37 of the upper end portion 35 and the lower end face 74 of the outer portion of the raised portion 72, (2) decreasing a radial gap amount between the raised portion 72 and the recessed portion 36 when the valve is closed or (3) making the edges 72a, 35a as sharp as possible.

In addition, in order to assemble up the normally open electromagnetic valve with the settings described above, since the distance d between the raised portion 72 and the recessed portion 36 at the time of installation plays a crucial role, the normally open electromagnetic valve needs to be assembled in such a manner as to realize a desired value for the distance d.

On the other hand, when observing how the pressure receiving area of the seal portion 51 changes when the distance d changed as a result of the seal portion 51 and the valve seat surface 61 get worn after the valve has been long in use, the pressure receiving area becomes smaller as the distance d becomes shorter as is shown in FIG. 5B.

Then, in the normally open electromagnetic valve of the embodiment, the relationship between the valve closing force of the valve body 5 and the valve opening force by the working fluid is hardly changed even after the valve has been long in use by setting such that the distance d, which results when the valve body 5 is brought into abutment with the valve seat surface 61, stays within the predetermined distance range (d0 to d1) in the setting when the valve was initially put in use. For example, as is shown in FIG. 5A, the distance d is set such that the distance d becomes ds when the valve is initially put in use and the distance d becomes de after the valve has been long in use.

Namely, when a determined constant electric current is caused to flow through the coil 42, while the attraction force F, that is, the valve closing force is such as to be large according to the distance ds when the valve is started to be used, since the pressure receiving area is large, the valve opening force by the working fluid is also large.

On the other hand, after the valve has been long in use, while the attraction force F (the valve closing force) becomes small, since the pressure receiving area also becomes small, the valve closing force by the working fluid also becomes small.

Consequently, even after the valve has been long in use, the relationship between the energizing current which is caused to flow through the coil 42 and the produced differential pressure at which the valve is opened is made difficult to change.

As is seen from the relationship that has been described above, the gradient of the graph of the attraction force F when the distance ds stays within the predetermined range is most desirably equal to the gradient of a graph of the pressure receiving area when the distance ds stays within the predetermined range. This is because as this occurs, even after the valve has been long in use, the relationship between the energizing current which is caused to flow through the coil 42 and the produced differential pressure at which the valve is opened does not change.

The function and advantage of the normally open electromagnetic valve that is configured as has been described above will be described.

When in a normal state, in the normally open electromagnetic valve, the valve body 5 is kept staying apart from the valve seat surface 61 by the return spring 81, whereby the working fluid freely flows from the flow path R1 towards the flow path R2.

Then, when the coil 42 is energized, the fixed core 3 and the movable core 7 are energized so as to attract each other, and the seal portion 51 is brought into abutment with the valve seat surface 61, so as to cut off the communication between the flow path R1 and the flow path R2. However, depending upon the magnitude of the energizing current, the valve closing pressure is determined, and when a difference between the pressure of the working fluid in the flow path R1 and the pressure of the working fluid in the flow path R2 exceeds the produced differential pressure which is determined by the valve closing force, the working fluid pushes up the valve body 5, whereby the working fluid flows from the flow path R1 to the flow path R2. Namely, the electromagnetic valve 1 functions as the linear solenoid valve.

In addition, when the valve is started to be used, the distance d between the raised portion 72 and the recessed portion 36 stays at ds (refer to FIG. 5A), which is the predetermined range (d0 to d1) where the attraction force F acting therebetween becomes smaller as the fixed core 3 and the movable core 7 approach each other.

After the normally open electromagnetic valve has been long in use, as is shown in FIG. 3B, the situation emerges in which the valve seat surface 61 gets worn and the valve body 5 further bites into the valve seat surface 61 than when the valve was started to be used. Due to this, the distance d resulting after the valve has been long in use at which the valve at which the valve body 5 is in abutment with the valve seat surface becomes shorter than that which resulted when the valve was started to be used, and the seal diameter is also changed to decrease from D0 to D1, whereby the pressure receiving area also gets smaller.

Due to this, as is shown in FIG. 5A, since the distance d approaches from ds to de, although the attraction force F becomes smaller than that resulting when the valve was started to be used, the pressure receiving surface also becomes smaller in association therewith as is shown in FIG. 5B. Therefore, the valve opening force by the working fluid also becomes smaller. Namely, even after the valve has been long in use, the relationship between the energizing current which is caused to flow through the coil 42 and the produced differential pressure at which the valve is opened still stays difficult to change.

In this way, in the normally open electromagnetic valve of the embodiment, there is provided the advantage that the produced differential pressure between when the valve is started to be used and after it has been long in use is made difficult to change.

Although this advantage is also effective in normally open electromagnetic valves in general, the advantage is particularly effective in a linear solenoid valve like the one described in this embodiment which can change the produced differential pressure for the valve body 5 according to the value of electric current which is caused to flow through the coil 42.

While the embodiment of the invention has been described heretofore, the invention is not limited to the embodiment that has been described heretofore but can be carried out while being modified variously.

For example, while in the embodiment, the valve body 5 and the movable core 7 are configured as the separate components, and the retainer 56 is provided so as to allow the valve body 5 and the movable core 7 to move together, the provision of the retainer 56 is arbitral, and the valve body 5 and the movable core 7 can be configured as an integral unit.

In addition, while in the embodiment, the recessed portion 36 is formed on the fixed core 32, while the raised portion 72 is formed on the movable core 7, on the contrary to this, a raised portion can be formed on the fixed core 3, while a recessed portion can be formed on the movable core 7.

What is claimed is:

1. A normally open electromagnetic valve comprising:
a fixed core,
a movable core disposed so as to advance and retreat relative to the fixed core;
a coil which produces a magnetic field passing through the fixed core and the movable core;
a valve body disposed so as to move together with the movable core;
a valve seat member comprising a funnel-shaped valve seat surface which is adapted to be brought into abutment with the valve body so as to close a flow path;
a return spring for biasing the valve body so as to move apart from the valve seat surface;
a raised portion formed at one of the fixed core and the movable core so as to project towards the other of the fixed core and the movable core; and
a recessed portion formed at the other of the fixed core and the movable core so as to face the raised portion,
wherein
a relationship between the raised portion and the recessed portion is set such that while a distance therebetween is within a predetermined range, an attraction force acting between the fixed core and the movable core by virtue of an excitation force of the coil decreases as the raised portion approaches or moves into the recessed portion, and
when the valve body and the valve seat surface are brought into abutment with each other by exiting the coil, the distance between the raised portion and the recessed portion stays within the predetermined range, and
the funnel-shaped valve seat surface wears to a spherically shaped surface of the seal portion such that when the seal portion is brought into contact with the funnel-shaped valve seat surface, the seal portion contacts the funnel-shaped valve seat surface in a surface fashion at a smaller seal diameter D1 than a seal diameter D0 which resulted when the electromagnetic valve was initially put in use.

2. The normally open electromagnetic valve as set forth in claim 1, wherein
the normally open electromagnetic valve is a linear solenoid valve which is capable of changing a produced differential pressure according to a value of current which flows through the coil.

3. The normally open electromagnetic valve as set forth in claim 1, wherein the movable core is integrated with the fixed core.

4. The electromagnetic valve as set forth in claim 1, wherein a relationship between the raised portion and the recessed portion is set such that while a distance therebetween is closer together, outside the predetermined range, an attraction force acting between the fixed core and the movable core by virtue of an excitation force of the coil increases as the raised portion approaches or moves into the recessed portion and away from the predetermined range.

5. The electromagnetic valve as set forth in claim 4, wherein a relationship between the raised portion and the recessed portion is set such that while a distance therebetween is farther away, outside the predetermined range, an attraction force acting between the fixed core and the movable core by virtue of an excitation force of the coil increases as the raised portion approaches or moves into the recessed portion and toward the predetermined range.

6. The electromagnetic valve as set forth in claim 1, wherein a pressure receiving area of the seal portion becomes smaller as the distance between the seal portion and the funnel-shaped valve seat surface get worn after use.

7. The electromagnetic valve as set forth in claim 1, wherein the relationship between the valve closing force of the valve body and the valve opening force by working fluid is not substantially changed even after the electromagnetic valve has been used as the relationship remains within the predetermined distance range as when the electromagnetic valve was initially put in use.

8. The normally open electromagnetic valve as set forth in claim 1, wherein
 the valve body comprises:
  a semi-spherical seal portion; and
  a stem portion which extends from the seal portion towards the movable core,
   wherein a diameter of an end portion of the seal portion is larger than a diameter of the stem portion, and
 a space into which the fluid flows out is defined in an area which is located on an extended line extending from a small diameter end portion to a large diameter end portion of the valve seat surface.

9. The electromagnetic valve as set forth in claim 1, wherein the valve seat member is a flat cylindrically shaped member and the funnel-shaped valve seat surface is formed in a center of an upper surface thereof.

10. The electromagnetic valve as set forth in claim 1, wherein the seal portion is a semi-spherical seal portion and a diameter of an end portion of the seal portion is larger than a diameter of the stem portion.

11. An electromagnetic valve comprising:
 a fixed core;
 a movable core;
 a coil which generates a magnetic field which causes the fixed core and the movable core to attract each other;
 a valve body disposed to move with the movable core and comprising a seal portion having a first diameter and a stem portion having a second diameter smaller than the first diameter;
 a valve seat member comprising a valve seat surface which closes a flow path by being brought into abutment with the valve body, wherein,
 a relationship between the raised portion and the recessed portion is set such that while a distance therebetween is outside of a predetermined range, an attraction force acting between the fixed core and the movable core by virtue of an excitation force of the coil increases as the raised portion approaches or moves into the recessed portion, and
 a relationship between the raised portion and the recessed portion is set such that while a distance therebetween is within the predetermined range, an attraction force acting between the fixed core and the movable core by virtue of an excitation force of the coil decreases as the raised portion approaches or moves into the recessed portion,
 wherein the valve seat member comprises a funnel-shaped valve seat surface which is adapted to be brought into abutment with the valve body so as to close a flow path and the funnel-shaped valve seat surface wears to a spherically shaped surface of the seal portion such that when the seal portion is brought into contact with the funnel-shaped valve seat surface, the seal portion contacts the funnel-shaped valve seat surface in a surface fashion at a smaller seal diameter $D1$ than a seal diameter $D0$ which resulted when the electromagnetic valve was initially put in use.

12. The electromagnetic valve as set forth in claim 11, wherein the distance outside of the predetermined range is closer together and farther away than a distance within the predetermined range.

* * * * *